United States Patent
Park et al.

(10) Patent No.: US 9,443,463 B2
(45) Date of Patent: Sep. 13, 2016

(54) DISPLAY DEVICE WITH DUMMY LINES FOR REDUCING A NUMBER OF CHANNELS OF A GATE DRIVER INTEGRATED CIRCUIT

(71) Applicant: LG Display Co., Ltd., Seoul (KR)

(72) Inventors: Man Gyu Park, Paju-si (KR); Seung Cheol Oh, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 330 days.

(21) Appl. No.: 14/046,505

(22) Filed: Oct. 4, 2013

(65) Prior Publication Data

US 2014/0104252 A1    Apr. 17, 2014

(30) Foreign Application Priority Data

Oct. 12, 2012 (KR) .................. 10-2012-0113428

(51) Int. Cl.
G09G 3/20 (2006.01)
G02F 1/1345 (2006.01)

(52) U.S. Cl.
CPC .......... G09G 3/2096 (2013.01); G02F 1/1345 (2013.01); G02F 1/13452 (2013.01); G02F 2001/13456 (2013.01)

(58) Field of Classification Search
None
See application file for complete search history.

(56) References Cited

U.S. PATENT DOCUMENTS

| | | | |
|---|---|---|---|
| 2003/0016328 A1 | 1/2003 | Chung et al. | |
| 2003/0058205 A1 | 3/2003 | Yarita et al. | |
| 2004/0051835 A1* | 3/2004 | Hsieh | G09G 3/3648 349/143 |
| 2004/0135753 A1 | 7/2004 | Ootsu et al. | |
| 2006/0125784 A1* | 6/2006 | Jang | G06F 1/1616 345/156 |
| 2007/0052658 A1* | 3/2007 | Kim | G09G 3/3648 345/100 |
| 2008/0143655 A1* | 6/2008 | Ko | G09G 3/3291 345/82 |
| 2008/0238898 A1* | 10/2008 | Yamanaka | G09G 3/3614 345/204 |
| 2010/0134528 A1* | 6/2010 | Kim | G09G 3/3688 345/690 |
| 2010/0171687 A1* | 7/2010 | Chiang | G09G 3/3648 345/98 |
| 2010/0320472 A1* | 12/2010 | Liu | G02F 1/136259 257/59 |
| 2012/0038621 A1* | 2/2012 | Nose | G09G 3/3648 345/213 |

FOREIGN PATENT DOCUMENTS

| | | |
|---|---|---|
| CN | 1397822 A | 2/2003 |
| CN | 1410965 A | 4/2003 |
| CN | 1499279 A | 5/2004 |

OTHER PUBLICATIONS

Office Action for Chinese Patent Application No. CN 201310472850.7, Oct. 9, 2015, 8 Pages.

* cited by examiner

*Primary Examiner* — Quan-Zhen Wang
*Assistant Examiner* — David Lee
(74) *Attorney, Agent, or Firm* — Fenwick & West LLP

(57) ABSTRACT

Disclosed is a display device. The display device includes a plurality of MCC packages each including one source driver IC and one gate driver IC disposed on a film, a panel including a plurality of data lines connected to the source driver IC, a plurality of gate connection lines that are connected to the gate driver IC and disposed in parallel to the data lines, a plurality of gate lines that are disposed vertically to the gate connection lines and the data lines and connected to the gate connection lines, and a plurality of dummy lines disposed in parallel to the gate connection lines and between the data lines, and a timing controller configured to transfer image data and a plurality of control signals to at least one or more of the MCC packages.

9 Claims, 5 Drawing Sheets

DISPLAY DEVICE WITH DUMMY LINES FOR REDUCING A NUMBER OF CHANNELS OF A GATE DRIVER INTEGRATED CIRCUIT

CROSS-REFERENCE TO RELATED APPLICATIONS

This application claims the benefit of the Korean Patent Application No. 10-2012-0113428 filed on Oct. 12, 2012, which is hereby incorporated by reference as if fully set forth herein.

BACKGROUND

1. Field of the Invention

The present invention relates to a display device, and more particularly, to a display device in which the number of channels of a gate driver IC is reduced.

2. Discussion of the Related Art

Flat panel display (FPD) devices are applied to various electronic devices such as portable phones, tablet personal computers (PCs), notebook computers, etc. The FPD devices include liquid crystal display (LCD) devices, plasma display panels (PDPs), organic light emitting diode (OLED) display devices, etc. Recently, electrophoretic display (EPD) devices are widely used as the FPD devices.

FIG. 1 is an exemplary diagram schematically illustrating a related art display device.

The related art display device, as illustrated in FIG. 1, includes a panel 1 that displays an image, a gate driver IC 2, a source driver IC 3, and a timing controller (not shown).

A plurality of bezel parts 4 and 5, in which an image is not outputted, are respectively provided at both sides of the panel 1 of the related art display device, for adhering the gate driver IC 2.

FIG. 2 is an exemplary diagram schematically illustrating another related art display device, and FIG. 3 is a diagram illustrating an internal configuration of a Multi-Chip Chip on film (MCC) package applied to the display device of FIG. 2.

As described above, in order to prevent a width of the bezel parts 4 and 5 from increasing due to the gate driver IC 2 adhered to both sides of the panel 1, as illustrated in FIG. 2, an MCC package 50 in which a gate driver IC 40 and a data driver IC 30 are provided on a film 20 is connected in plurality to a non-display area 11 on the panel 10.

Therefore, a left bezel part 12 and right bezel part 13 of the panel 10 may be provided the most narrowly, and thus, a narrow panel can be realized.

That is, in the MCC package 50 for driving a narrow panel, one source driver IC 30 and one gate driver IC 40 are built into one film 20.

Here, the number of outputs of the gate driver IC 40 is relevant to resolution of data lines. That is, when resolution of a Full High Definition (FHD) model is 1920*1080, a gate double feeding scheme is driven, and sixteen MCC packages 50 are used, an output of the source driver IC 30 is configured with 369 channels, and an output of the gate driver IC 40 is configured with 180 channels corresponding to half of the output of the source driver IC 30.

In this case, as illustrated in FIG. 3, in order to prevent the overlap of a plurality of source lines 31 and a plurality of output gate connection lines 41, two source lines should pass through a space between two channels of the gate driver IC 40 and should be connected to a plurality of data lines, and the output gate connection lines 41 respectively connected to the channels of the gate driver IC 40 should be connected to the gate connection lines 41 of the panel 10 with two source lines 31 therebetween.

Therefore, the number of channels of the gate driver IC 40 should be equal to or more than half of the number of channels of the source driver IC 30.

TABLE 1

| | Division | | | | |
| --- | --- | --- | --- | --- | --- |
| | Source driver IC | | Gate driver IC | | |
| | Theoretical value | Real value | Theoretical value | Real value | Deviation |
| FHD (1920*1080) | 5760 channels | 360 channels *16 each = 5760 channels | 2160 channels | 180 channels * 16 each = 2880 channels | 720 ch (180 channels * 4 each) |

As shown in Table 1, in the FHD model having resolution of 1920*1080, since the number of gate lines is 1080 and the number of data lines is 5760 (=1920×3), when the source driver IC 30 having 360 channels is applied, 16 (=5760/360) source driver ICs 30 are required for providing a total of 5760 channels, and thus, a total of 16 MCC packages 50 are needed. In this case, 16 MCC packages 50 are used, and thus, the channels of the source driver IC 30 properly match the resolution (the number) of data lines.

In the FHD model having resolution of 1920*1080, if the number of gate lines is 1080 and the gate lines are driven by the gate double feeding scheme, a total of 2160 channels (=1080×2) are needed, and thus, when the source driver IC 30 having 180 channels is applied, 12 (=2160/180) source driver ICs 30 are required for providing a total of 2160 channels. However, due to peculiarities in the process of manufacturing the MCC package 50, one data driver IC 30 and one gate driver IC 30 should be necessarily mounted on each of the MCC packages 50.

Therefore, whenever one display device is manufactured, four gate driver ICs are wasted.

Moreover, among the data lines formed at the panel 10, some data lines cannot be adjacent to the gate connection lines.

For example, in FIG. 2, when the gate driver ICs respectively mounted on middle four MCC packages 51 to 54 are the above-described unnecessary gate driver ICs, the data lines respectively connected to the source lines 31 of the four MCC packages 51 to 54 are not adjacent to the gate connection lines.

In this case, a difference in electric field occurs between an area (in which the data lines are not adjacent to the gate connection lines) and an area in which a gate connection line receiving a high-voltage or low-voltage scan signal is adjacent to a data line receiving a data signal, and an image-quality defect is caused by the electric field difference.

Moreover, despite that a plurality of dummy lines having the same type as the gate connection lines are formed in an area in which the data lines are not adjacent to the gate connection lines so as to keep pace with areas in which a corresponding gate line is adjacent to a corresponding data line, since no signal is applied to the dummy lines, defects in the image-quality occurs.

SUMMARY

Accordingly, the present invention is directed to provide a display device that substantially obviates one or more problems due to limitations and disadvantages of the related art.

An aspect of the present invention is directed to provide a display device in which the number of channels of a gate driver IC can be reduced, and a low voltage (VGL) can be applied to a plurality of dummy lines formed in parallel to a plurality of gate connection lines.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a plurality of MCC packages each including one source driver IC and one gate driver IC disposed on a film; a panel in which a plurality of data lines connected to the source driver IC, a plurality of gate connection lines that are connected to the gate driver IC and disposed in parallel to the data lines, a plurality of gate lines that are disposed vertically to the gate connection lines and the data lines and connected to the gate connection lines, and a plurality of dummy lines disposed in parallel to the gate connection lines and between the data lines are formed; and a timing controller configured to transfer image data and a plurality of control signals to at least one or more of the MCC packages.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Hereinafter, embodiments of the present invention will be described in detail with reference to the accompanying drawings. In the following description, for convenience of description, an LCD device will be described as an example of the present invention, but the present invention is not limited thereto. That is, the present invention may be applied to various display devices that display an image by using a plurality of gate lines and a plurality of data lines.

Figure 4:
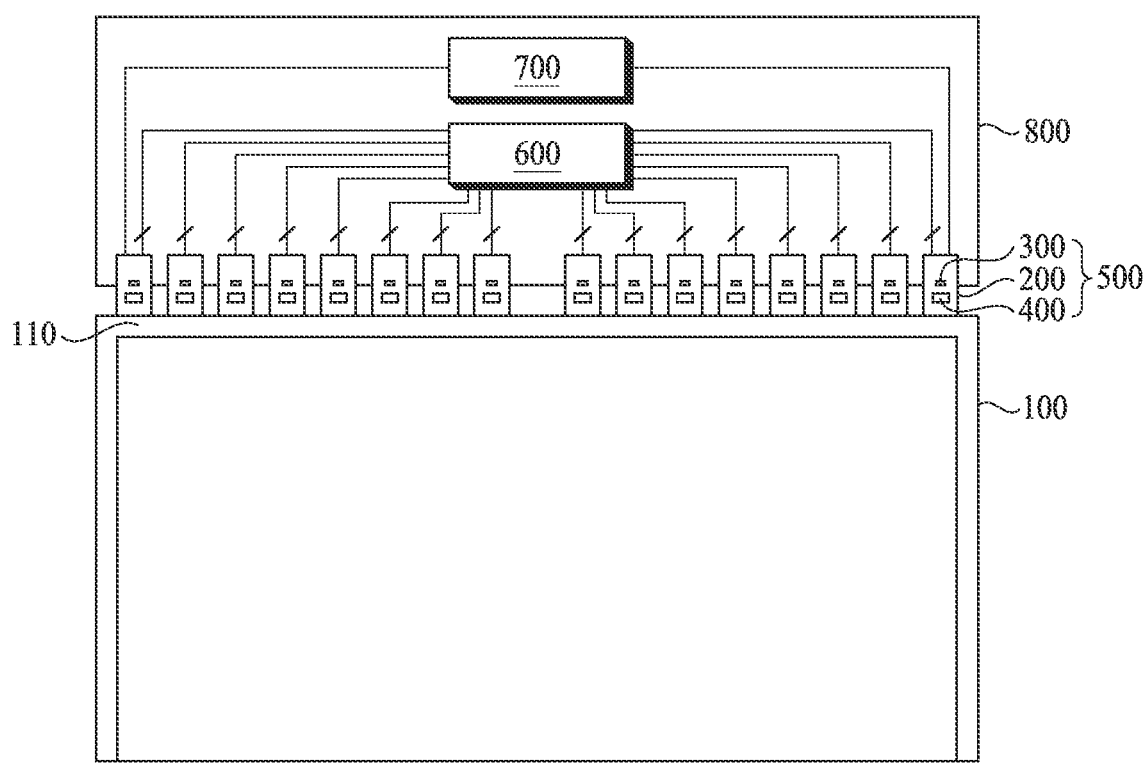
FIG. 4 is an exemplary diagram schematically illustrating a display device according to one embodiment of the present invention.
Figure 5:
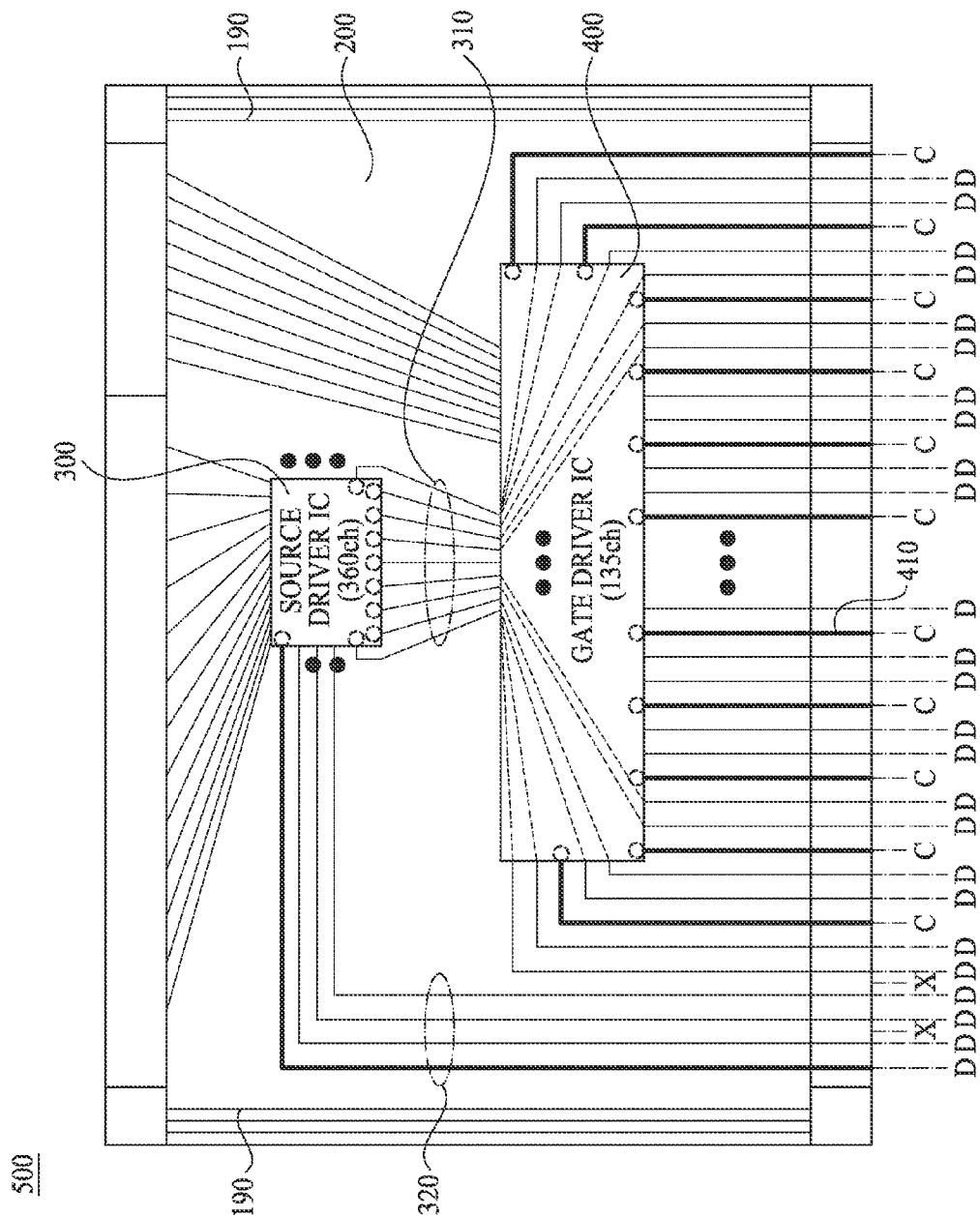
FIG. 5 is a diagram illustrating an embodiment of an internal configuration of an MCC package applied to the display device according to the present invention.
Figure 6:
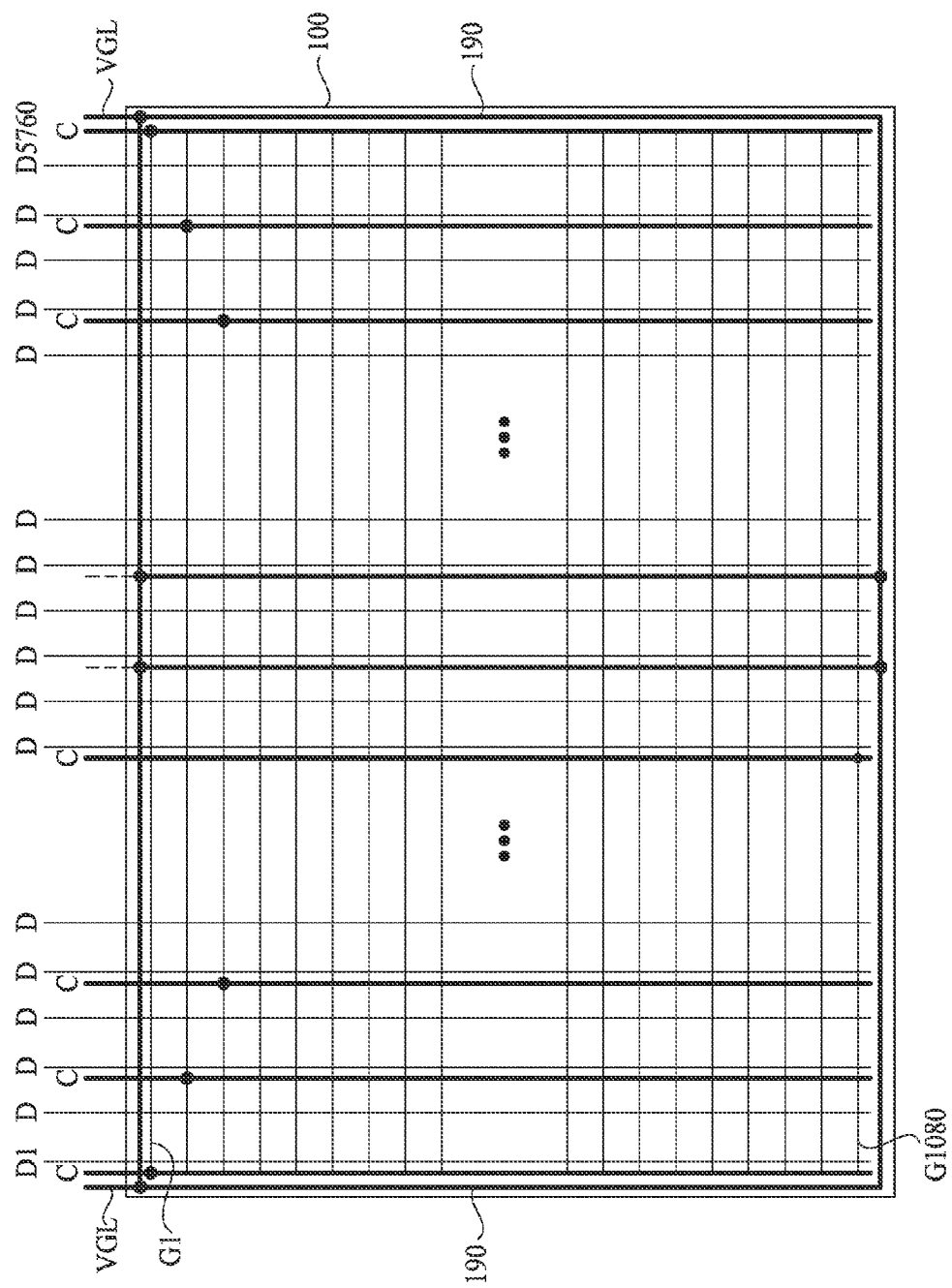
FIG. 6 is an exemplary diagram illustrating in detail a configuration of a panel applied to the present invention.

FIG. 4 is an exemplary diagram schematically illustrating a display device according to the present invention, FIG. 5 is a diagram illustrating an embodiment of an internal configuration of an MCC package applied to the display device according to the present invention, and FIG. 6 is an exemplary diagram illustrating in detail a configuration of a panel applied to the present invention.

The display device according to the present invention, as illustrated in FIG. 4, includes: an MCC package 500 that is configured with one source driver IC 300 and one gate driver IC 400 disposed on a film 200; a panel 100 in which a plurality of data lines D connected to the source driver IC 300, a plurality of gate connection lines C that are connected to the gate driver IC 400 and disposed in parallel to the data lines D, a plurality of gate lines G that are disposed vertically to the gate connection lines C and the data lines D and connected to the gate connection lines C, and a plurality of dummy lines X disposed in parallel to the gate connection lines C between the data lines D are formed; a timing controller 600 that transfers image data and a plurality of control signals to at least one or more of the MCC packages 500; a low voltage generator 700 that applies a low voltage VGL to the dummy lines X. Here, the timing controller 600 and the low voltage generator 700 may be mounted on a main board 800, which is connected to the at least one or more MCC packages 500.

First, the MCC package 500 is configured in a type in which one source driver IC 300 and one gate driver IC 400 are mounted on the film 200 formed of a flexible material.

The source driver IC 300 converts digital image data, transferred from the timing controller 600, into image signals having the form of analog voltages, and transfers the image signals to the respective data lines D. The source driver IC 300 may have a plurality of channels, but hereinafter, a source driver IC having 360 channels will be described as an example of the present invention.

The gate driver IC 300 generates a scan signal according to a gate control signal transferred from the timing controller 600, and transfers the scan signal to the gate lines G through the gate connection lines C formed at the panel 100. The number of channels of the gate driver IC 400 may be variously implemented in consideration of the resolution of the panel 100 and the number of MCC packages. Especially, the number of channels of the gate driver IC 400 may be implemented such that the total number of channels of all the gate driver ICs 400 applied to the display device according to the present invention match the number of gate lines G of the panel 100.

TABLE 2

| | Division | | | |
|---|---|---|---|---|
| | Total number of channels of the related art gate driver ICs | | Total number of channels of gate driver ICs of the embodiment of the present invention | |
| | Theoretical value | Real value | Theoretical value | Real value |
| FHD (1920*1080) | 2,160 channels | 180 channels *16 each = 2,880 channels | 2,160 channels | 135 channels * 16 each = 2160 channels (720 ch ↓, 25% ↓) |

For example, in an FHD model in which resolution of the panel 100 in which the gate lines are driven by a gate double feeding scheme is 1920*1080, since the number of data lines is 5760 (=1920×3), when a source driver IC having 360 channels is needed, in the related art, 16 gate driver ICs each having channels equal to half of the number of channels of the source driver IC is used, and thus, a total of 2880 channels are provided. Therefore, 720 channels (i.e., 4 (=720/180) gate driver ICs) corresponding to a number difference between actually required 2160 (=1080×2) channels and the 2880 channels are wasted.

However, as shown in Table 2 above, the embodiment of the present invention uses 16 gate driver ICs 400 each having 135 channels, and thus, the total number of channels of the gate driver ICs properly matches the number of actually required 2160 channels.

Moreover, the number of channels of the gate driver IC 400 may be variously set within a range which is more than a number (135), in which the total number of channels of the gate driver ICs properly matches the number of actually required 2160 channels, and is less than half (180) of the number (360) of channels of the source driver IC.

In comparison with the related art, the present invention reduces the number of channels of the gate driver IC, and thus can reduce a size of the gate driver IC and the manufacturing cost.

As described above, the reason that the present invention can reduce the number of channels of the gate driver IC is because the arrangement of a plurality of source lines 310 and 320 and a plurality of output gate connection lines 410 is changed in the MCC package 50.

That is, as illustrated in FIG. 5, at least one or more first source lines 310 of the source lines extending from the source driver IC 300 are connected to the data lines D through a space between the channels of the gate driver IC 400, and at least one or more second source lines 320 of the source lines are connected to the data lines D without passing through the space between the channels of the gate driver IC 400.

Here, as described above, when the gate driver IC 400 is configured with 135 channels and the source driver IC 300 is configured with 360 channels, 270 first source lines 310 corresponding to two times 135 among the source lines 310 and 320 may be connected to the data lines D through the space between the channels of the gate driver IC 400. In this case, two first source lines 310 pass through a space between two channels of the gate driver IC 400.

Among a total of 360 source lines extending from the source driver IC 300, 90 second source lines 320 other than the 270 source lines are connected to the data lines D without overlapping the gate driver IC 400 as illustrated in FIG. 5.

Therefore, two first source lines 310 connected to the data lines D are formed between two output gate connection lines 410 that extend from the gate driver IC 400 to be connected to the gate connection lines C.

Thus, in the panel 100, as illustrated at the right and the left of FIG. 5, two data lines D connected to the first source lines 310 are formed between two gate connection lines C connected to the two output gate connection lines 410.

Moreover, as illustrated in the middle of FIG. 5, the data lines D connected to the second source lines 320 are formed between two dummy lines X.

That is, as illustrated in FIG. 4, since the first source lines 310 are connected to the data lines D through a space between the channels of the gate driver IC 400, two data lines D are formed between two gate connection lines C respectively connected to corresponding output gate connection lines 410 that are in turn connected to corresponding channels of the gate driver IC 400.

Moreover, since the second source lines 320 are connected to the respective data lines D independently from the channels of the gate driver IC 400, the second source lines 320 are formed on the panel 100 irrespective of the gate connection lines C connected to the output gate connection lines 410.

However, in the present invention, two data lines D connected to corresponding second source lines 320 are formed between two dummy lines X so as to keep pace with a relationship between the gate connection lines C and the data lines D.

Therefore, in the panel 100, a structure in which two data lines D are formed between two lines is repeatedly provided.

In this case, when the panel 100 is separated from the display device, it is unable to determine whether the two lines are the gate connection lines C or the dummy lines X.

However, when the MCC package 500 is connected to the panel 100, the gate connection lines C are connected to the gate driver IC 400 mounted on the MCC package 500, but the dummy lines X are not connected to the gate driver IC 400. Accordingly, the lines can be discerned with eyes.

The gate driver IC 400 mounted on the MCC package 500 generates a scan signal according to a gate control signal transferred from the timing controller 600, and transfers the scan signal to the gate connection lines C, formed at the panel 100, through the output gate connection lines 410. The scan signal transferred to the gate connection lines C is applied to a plurality of pixels, formed at the panel 100, through the gate lines G.

Here, in comparison with the related art gate driver IC, as described above, the gate driver IC 400 can have a small number of channels, and thus can be reduced in size.

The data driver IC 300 mounted on the MCC package 500 converts digital image data, transferred from the timing controller 600, into analog image signals, and supplies the image signals for one horizontal line to the data lines D at every one horizontal period in which the scan signal is supplied to one gate line.

The source driver IC 300 converts the image data into the image signals by using gamma voltages supplied from a gamma voltage generator (not shown), and outputs the image signals to the respective data lines. To this end, the source driver IC 300 includes a shift register, a latch, a digital-to-analog converter (DAC), and an output buffer.

Figure 1:
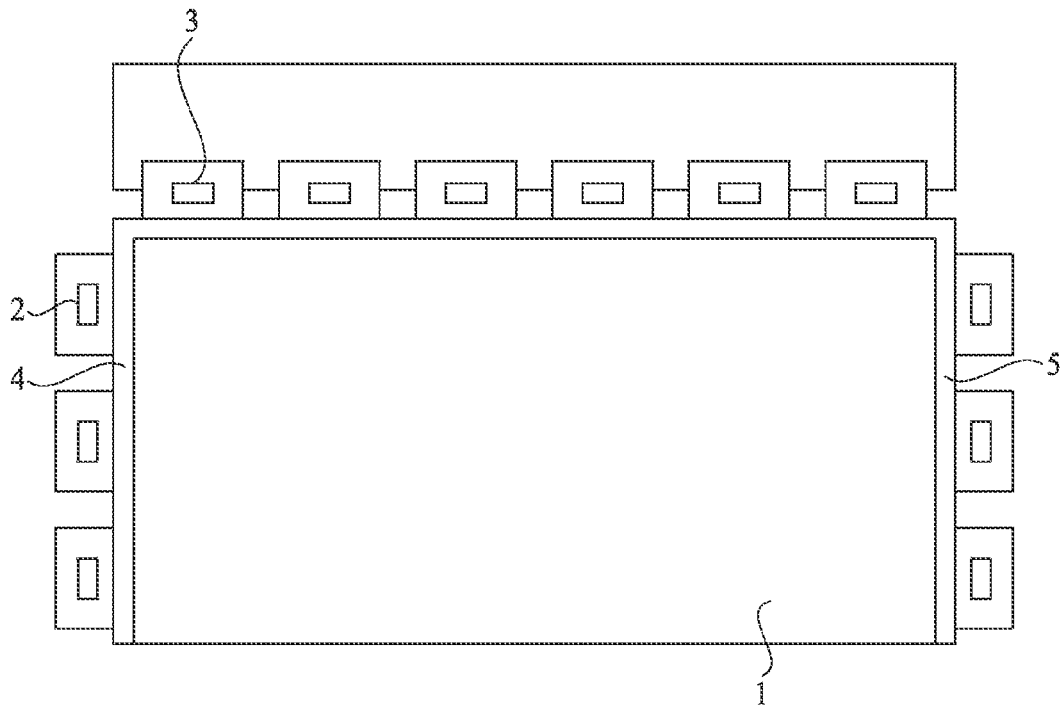
FIG. 1 is an exemplary diagram schematically illustrating a related art display device.
Figure 2:
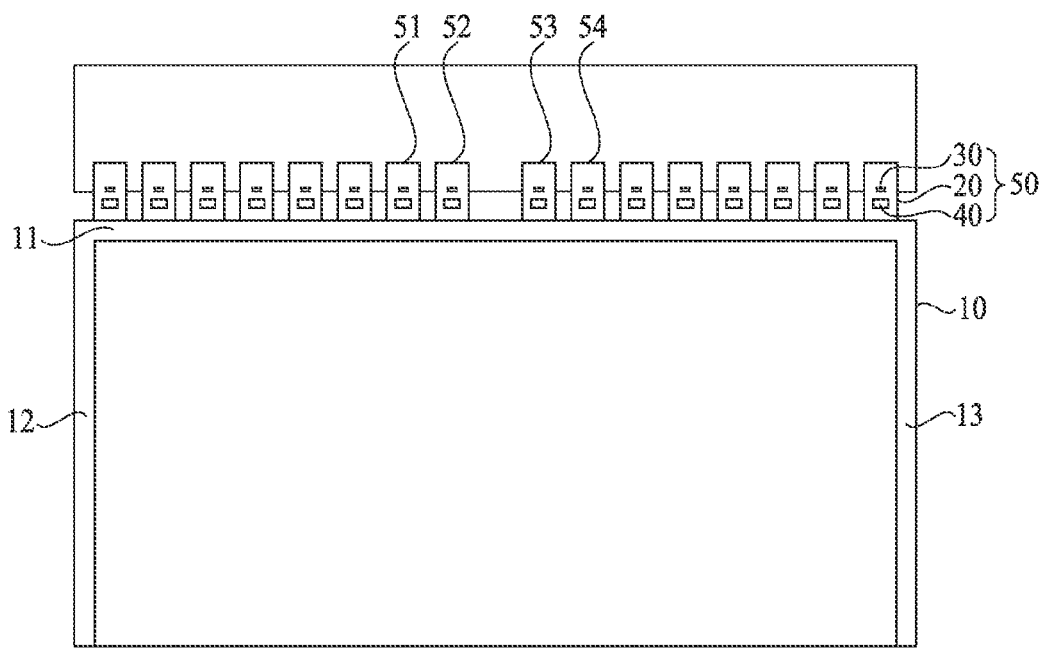
FIG. 2 is an exemplary diagram schematically illustrating another related art display device.
Figure 3:
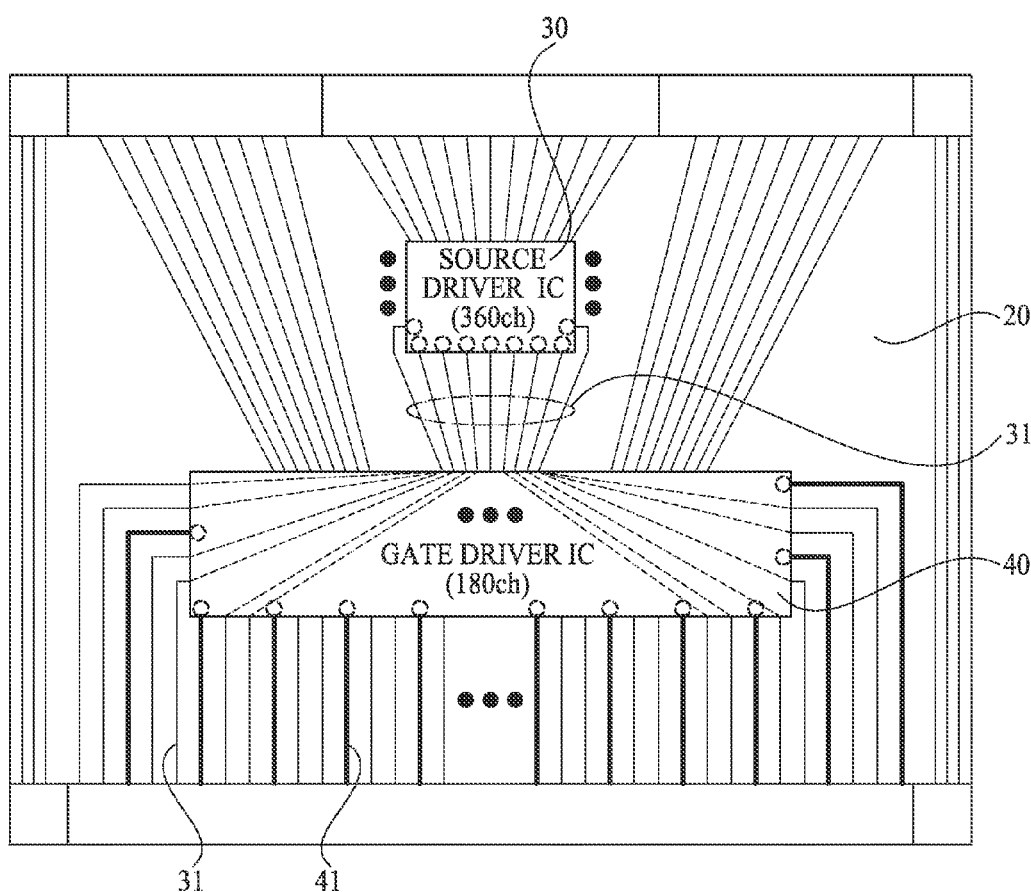
FIG. 3 is a diagram illustrating an internal configuration of an MCC package applied to the display device of FIG. 2.

A function and configuration of the source driver IC 300 are the same as those of a generally used source driver IC. However, as illustrated in FIG. 5, a type in which the source lines 310 and 320 connected to the channels (connection pins) of the source driver IC 300 are disposed on the film 200 of the MCC package 500 differ from a type in which the related art source driver IC (see FIG. 3) is disposed on a film of an MCC package.

That is, as described above, the first source lines 310 of the source lines connected to the source driver IC 300 applied to the present invention are connected to the respective data lines D through a space between the channels (pins) of the gate driver IC 400, and the second source lines 320 are directly connected to the respective data lines D without passing through the gate driver IC 400.

The timing controller 600 aligns video data inputted from an external system so as to match a structure and characteristic of the panel 100, and transfers the aligned image data to the source driver IC (a data driver IC) 300. Also, the timing controller 600 generates a data control signal for controlling the source driver IC 300 and a gate control signal for controlling the gate driver IC 400 by using a plurality of timing control signals transferred from the external system, and transfers the control signals to the source driver IC 300 and the gate driver IC 400.

The panel 100 includes the data lines D that extend from a first side surface 110 (at which the MCC package 500 is provided) of four side surfaces of the panel 100 and in a direction of a second side surface opposite to the first side surface 110 of the four side surfaces, the gate connection lines C that are provided at certain intervals and in parallel to the data lines, the gate lines G that vertically intersect the data lines D and the gate connection lines C, and the dummy lines X that are provided in parallel to the gate connection lines C.

Here, an interval between the gate connection lines C, an interval between the dummy lines X, and an interval between adjacent gate connection line and dummy line are substantially constant.

That is, as described above, since the gate connection lines C and the dummy lines X are successively provided in the same pattern with two data lines D therebetween, it is unable to externally discern the gate connection lines C and the dummy lines X.

The data lines D and the gate lines G may be provided on the panel 100 to vertically intersect each other, and various kinds of driving elements may be provided in each of the plurality of pixels defined by intersections between the data lines D and the gate lines G. For example, when the panel 100 is a liquid crystal panel, an electrophoretic panel, or an organic light emitting panel, a thin film transistor (TFT) may be formed in each pixel.

In this case, each of the pixels displays an image by using the scan signal transferred through a corresponding gate line G and an image signal transferred through a corresponding data line D.

For example, when the panel 100 is the liquid crystal panel, a refractive index of a liquid crystal of each pixel may be changed by the image signal, and a light transmittance may be changed according to the change in the refractive index, thereby displaying an image. Also, when the panel 100 is an organic light emitting panel, a current or voltage flowing to an organic light emitting diode (OLED) formed in each pixel may be changed according to the image signal, thereby displaying an image.

The data lines D are connected to the source driver IC 300 through the first source lines 310 or the second source lines 320. Here, the gate connection lines C may be respectively disposed at the right and the left of two data lines D respectively connected to the first source lines 310, and the dummy lines X may be respectively disposed at the right and the left of two data lines D respectively connected to the second source lines 310.

The gate connection line C is connected to the gate driver IC 400 through a corresponding output gate connection line 410. The gate connection line C transfers the scan signal, transferred from the gate driver IC 400 through the output gate connection line 410, to a corresponding gate line G.

The gate lines G are disposed on the panel 100 in a direction vertical to the data lines D and the gate connection lines C, and receive the scan signal from a corresponding gate connection line C to transfer the scan signal to a corresponding pixel.

The dummy lines X are disposed on the panel 100 in the same pattern as the gate connection lines C, but since the dummy lines X are not connected to the gate driver IC 400, the scan signal is not applied to the dummy lines X.

Finally, the low voltage generator 700 applies the low voltage VGL to the dummy lines X.

As described above, the dummy lines X to which the scan signal is not applied are disposed on the panel 100 in the same pattern as the gate connection lines C. However, since the scan signal is not inputted to the dummy lines X, a capacitance between corresponding dummy line X and data line D becomes different from a capacitance between corresponding gate connection line C and data line D. Such a difference in capacitance can affect the image signal applied to a corresponding pixel or other driving signals.

Therefore, the present invention continuously applies the low voltage VGL to the dummy lines X by using the low voltage generator 700.

Generally, the scan signal is sequentially inputted to the gate lines G during one vertical period (one frame). Therefore, the scan signal is sequentially inputted to the gate connection lines G connected to the respective gate lines G during one vertical period.

However, a period in which the high-voltage scan signal is inputted to each of the gate lines G is a very short time, in comparison with one vertical period. Therefore, the low voltage VGL having a level lower than the scan signal is applied to the gate lines G and the gate connection lines C for most of time during one vertical period.

Therefore, the present invention applies the low voltage VGL to the dummy lines X, and thus, a characteristic of the gate connection lines C to which the low voltage VGL is applied for most of time becomes equal to a characteristic of the dummy lines X.

In this case, the low voltage generator 700 may be applied to generate the scan signal.

To achieve the above-described function, a low voltage line 190 that transfers the low voltage VGL (transferred from the low voltage generator 700) to the dummy lines X is formed at an edge of the panel 100.

That is, as illustrated in FIG. 6, the low voltage line 190 formed at the panel 100 is connected to the dummy lines X at the first and second side surfaces of the panel 100, and supplies the low voltage VGL to the dummy lines X.

The low voltage line 190 may be connected to the low voltage generator 700 through the MCC package 500.

In this case, the low voltage line 190 may be connected to the low voltage generator 700 through one or two of the MCC packages 500 connected to the panel 100. In addition, in order to maximally prevent the low voltage line 190 from being disconnected from other lines, the low voltage line 190 may be connected to the low voltage generator 700 through the MCC packages 500 respectively mounted on both ends of the left and right of the panel 100.

Hereinabove, since the scan signal is assumed as having a high voltage VGH, the low voltage VGL has been described above as being applied to the dummy lines X in the present invention, but when the scan signal has the low voltage VGL, the high voltage VGH is applied to the dummy lines X. Therefore, in this case, the low voltage generator 700 may be replaced with a high voltage generator that generates the high voltage VGH.

In FIG. 6, for convenience of description, it is illustrated that the dummy lines X are concentrated on a middle portion of the panel 100, but the dummy lines X may be formed at the panel 100 in various types depending on a line structure of the MCC package 500 of FIG. 5.

As a first example, in the display device to which the MCC package 500 of FIG. 5 is applied, the dummy lines X are disposed from the left of the panel 100 of FIGS. 6, and 60 data lines D connected to a first MCC package connected to the leftmost side of the panel 100 are disposed between corresponding dummy lines X, the other 270 (=360–90) data lines D connected to the first MCC package are disposed between corresponding gate connection lines C, 60 data lines connected to a second MCC package connected to the right of the first MCC package are disposed between corresponding dummy lines X, and the other 270 (=360–90) data lines D connected to the second MCC package are disposed between corresponding gate connection lines C.

As a second example, when the second source lines 320 are connected to the data lines D through the right of the MCC package 500 in FIG. 5, in the above description, 270 data lines from the left of the panel 100 are preferentially disposed between corresponding gate connection lines C, and the other 90 data lines are disposed between corresponding dummy lines X.

That is, a type in which the gate connection lines C and the dummy line X are disposed in FIG. 6 may be variously implemented depending on a type in which the first source lines 310, second source lines 320, and output gate connection lines 330 formed at the MCC package 500 are disposed.

As described above, by reducing the number of channels of the gate driver IC, the present invention can decrease the size of the gate driver IC and the manufacturing cost, and thus prevent the gate driver IC from being unnecessarily wasted.

Moreover, by applying the low voltage VGL to the dummy lines formed in parallel to the gate connection lines, a difference in electric field does not occur between an area (in which a corresponding dummy line and a corresponding data line intersect each other on the panel) and areas in which the gate connection lines receiving the low-voltage or high-voltage scan signal intersect the data lines, and thus, an image-quality defect does not occur.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a plurality of Multi-Chip Chip on film (MCC) packages, each of the plurality of MCC packages including a corresponding film, one source driver IC disposed on the corresponding film and one gate driver IC disposed on the corresponding film;
    a panel including a plurality of gate lines, a plurality of data lines connected to source driver ICs of the plurality of MCC packages, a plurality of gate connection lines connected to gate driver ICs of the plurality of MCC packages, and a plurality of dummy lines disconnected from the gate driver ICs, the plurality of gate connection lines disposed in parallel to the plurality of data lines and the plurality of dummy lines, each of the plurality of gate connection lines configured to supply a scan signal to a corresponding one of the plurality of gate lines, the plurality of gate lines intersecting the plurality of gate connection lines, the plurality of data lines, and the plurality of dummy lines; and
    a timing controller configured to transfer image data and a plurality of control signals to at least one or more of the MCC packages.

2. The display device of claim 1, wherein,
    the timing controller is mounted on a main board, and
    the main board is connected to the at least one or more of the MCC packages.

3. The display device of claim 1, wherein a number of channels of a corresponding gate driver IC of one of the MCC packages is set within a range which is more than a predetermined number, in which a total number of channels of the gate driver ICs properly matches a number of channels required in the panel, and is less than half of a number of channels of a corresponding source driver IC of the one of the MCC packages.

4. The display device of claim 1, wherein,
    at least one or more first source lines of a plurality of source lines extending from a corresponding source driver IC of one of the MCC packages are respectively connected to corresponding data lines through a space between channels of a corresponding gate driver IC of the one of the MCC packages, and
    at least one or more second source lines of the source lines are respectively connected to corresponding data lines without passing through the space between the channels of the corresponding gate driver IC.

5. The display device of claim 4, wherein two first source lines respectively connected to corresponding data lines are formed at one of the MCC packages and between two output gate connection lines that extend from a corresponding gate driver IC of the one of the MCC packages to be connected to the output gate connection lines.

6. The display device of claim 1, wherein,
    the data lines extend from a first side surface, at which the MCC packages are provided, of four side surfaces of the panel and in a direction of a second side surface opposite to the first side surface of the four side surfaces,
    the gate connection lines are provided at certain intervals and in parallel to the data lines,
    the gate lines perpendicularly intersect the data lines, the gate connection lines and the dummy lines, and
    an interval between the gate connection lines, an interval between the dummy lines, and an interval between an adjacent gate connection line of the gate connection lines and a dummy line of the dummy lines are substantially constant.

7. The display device of claim 1, further comprising a low voltage generator configured to apply a low voltage to the dummy lines.

8. The display device of claim 7, further comprising a low voltage line formed at an edge of the panel, and configured to transfer the low voltage, transferred from the low voltage generator, to the dummy lines.

9. The display device of claim 8, wherein the low voltage line is connected to the low voltage generator through one of the MCC packages.

* * * * *